Nov. 14, 1944.   D. C. HUBBARD   2,362,555
CROSSARM FOR ELECTRIC LINES
Filed Dec. 19, 1941   2 Sheets-Sheet 1
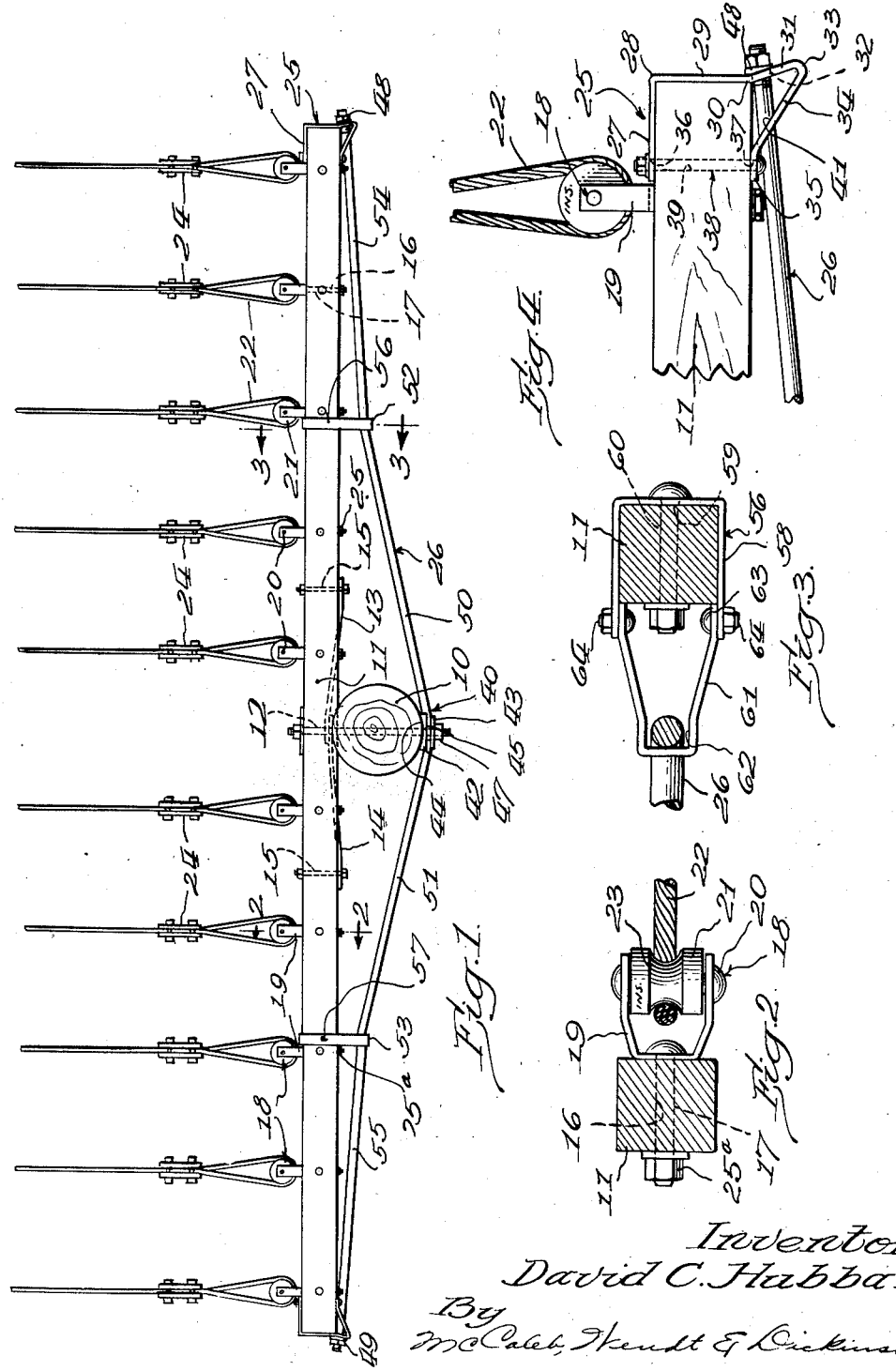
Inventor
David C. Hubbard
By
McCaleb, Wendt & Dickinson
Attys.

Nov. 14, 1944.  D. C. HUBBARD  2,362,555
CROSSARM FOR ELECTRIC LINES
Filed Dec. 19, 1941  2 Sheets-Sheet 2
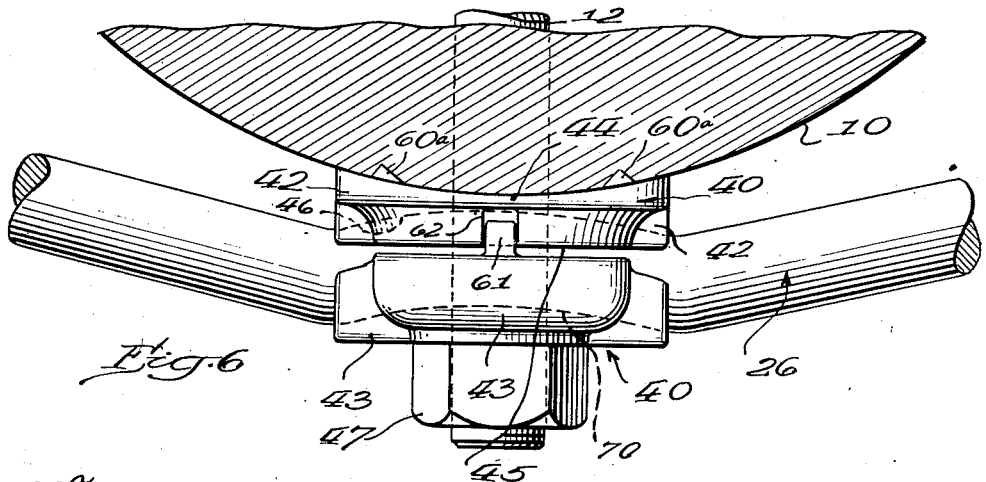
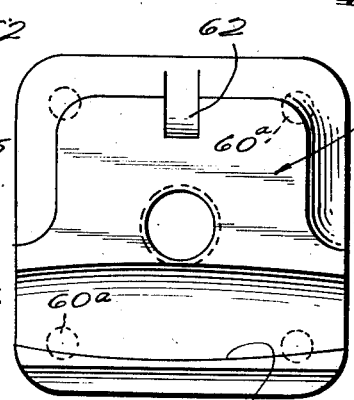 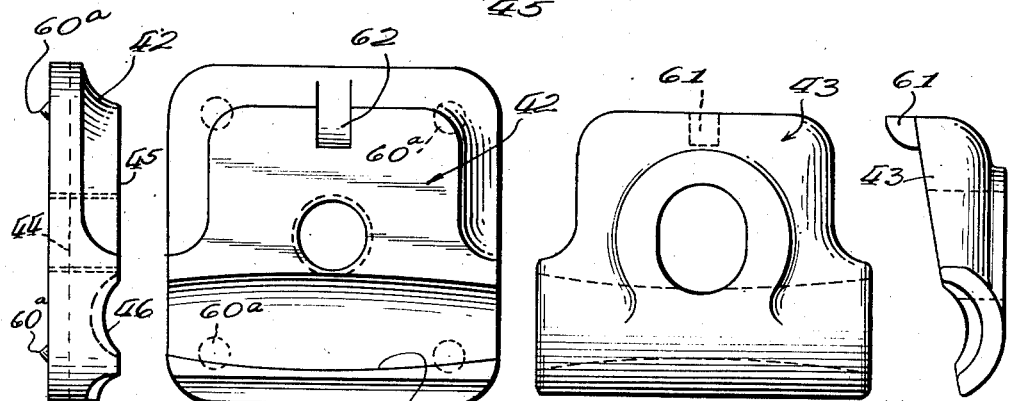 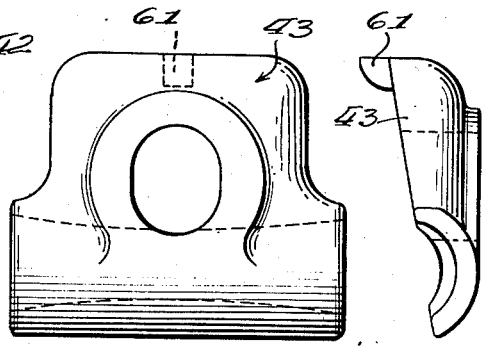
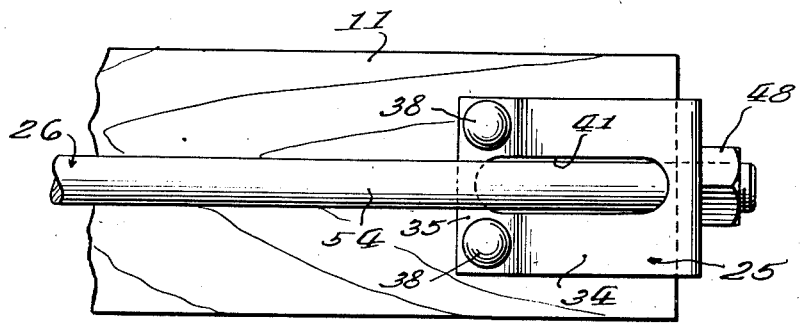
Inventor
David C. Hubbard
By McCaleb, Wendt & Dickinson
Attys Patented Nov. 14, 1944

2,362,555

UNITED STATES PATENT OFFICE 2,362,555

CROSSARM FOR ELECTRIC LINES

David C. Hubbard, Centralia, Mo., assignor to A. B. Chance Company, Centralia, Mo., a corporation of Missouri Application December 19, 1941, Serial No. 423,611

3 Claims. (Cl. 189—33)

The present invention relates to cross arms for electric lines, and is particularly concerned with the provision of an improved cross arm having a back truss structure.

One of the objects of the invention is the provision of an improved truss supported cross arm for use in supporting a dead end load which is stronger and more rigid than any of the cross arms of the prior art.

Another object of the invention is the provision of an improved cross arm structure, the strength and rigidity of which are greatly increased by means of a back truss.

Another object of the invention is the provision of an improved back truss structure which is simple, capable of economical manufacture, adapted to be used for a long period of time without any necessity for repair or replacement, and adapted to increase greatly the strength of a dead end cross arm at a minimum cost.

Another object of the invention is the provision of an improved back truss structure for cross arms, including means for preventing undue bending of each half of the cross arm at points intermediate between the ends of the cross arm and the middle of the cross arm.

Another object of the invention is the provision of an improved back truss structure for cross arms by means of which the strength of a cross arm is considerably increased so that it may be provided with a higher load and by means of which the undue bending of each half of the cross arm at its intermediate point is prevented.

Another object of the invention is the provision of an improved back truss structure for cross arms, having an adequate bearing area extending over the ends of the cross arm so that advantage will be taken of most of the end area of the cross arms for a bearing and the splitting of the ends of the cross arms is substantially eliminated.

Other objects and advantages of the invention will be apparent from the following description and the accompanying drawings, in which similar characters of reference indicate similar parts throughout the several views.

Referring to the two sheets of drawings accompanying the specification,

Fig. 1 is a fragmentary top plan view of a dead end installation having a cross arm and back truss embodying the invention;

Fig. 2 is a fragmentary sectional view, showing the connection of cables or conductors to the cross arm, by means of insulated dead end brackets;

Fig. 3 is a sectional view, taken on the plane of the line 3—3 of Fig. 1, showing one of the intermediate supports of the truss tension member;

Fig. 4 is a larger fragmentary side elevational view of the fitting at the end of the cross arm, to which the truss tension member is secured;

Fig. 5 is a fragmentary rear elevational view of the fixture of Fig. 4;

Fig. 6 is a fragmentary sectional view taken through the pole, showing the fixture for attachment of the rod to the pole in top plan;

Fig. 7 is a front elevational view of the saddle plate of the fixture of Fig. 6;

Fig. 8 is a side elevational view of the same plate;

Fig. 9 is a front elevational view of the clamping plate of Fig. 6;

Fig. 10 is a side elevational view of the clamping plate.

Referring to Fig. 1, this is an illustration of a dead end cross arm installation carried by a transmission line pole 10, having a cross arm 11 secured thereto by a bolt 12.

The bolt 12 passes through an aperture in the cross arm midway between its ends and also through an aperture in the bolt, and is also used for securing the truss to the pole.

The cross arm 11 is preferably provided with the usual cross arm braces 13, 14, which are both secured to the pole below the cross arm 11 in the usual way and to the cross arm by the bolts 15.

The cross arm 11 is provided with a plurality of transverse horizontal bores 16, preferably equally spaced from each other longitudinally of the cross arm, except at the middle, on each side of the bolt 12, where they may be more widely spaced.

The apertures 16 are adapted to receive the supporting bolts 17 of the dead end insulators 18, illustrated in Fig. 2. Any type of dead end insulator may be employed. The ones selected for illustration comprise a substantially U shaped sheet metal stirrup 19, having a through rivet 20 carried by its leg for supporting the spool insulator 21, about which the cable or conductor 22 extends.

The cable 22 is located in the insulator groove 23. It is customarily secured by means of a cable clamp 24, which secures the two ends of the cable together to form a loop extending about the insulator 21. The stirrup 19 of the dead end insulator 18 has an aperture in its yoke for passing the bolt 17 by means of which it is clamped against the sides of the cross arm and secured by a nut 25a.

The bolt apertures 16 are preferably located midway between the top and bottom of the cross arm in order to provide a balanced load on the cross arm.

The cross arm 11 is preferably provided at both of its ends with a fixture 25 adapted to secure the truss tension member 26 to each end of the cross arm. These fixtures are identical on the opposite ends of the cross arm, but are reversed in position.

The fixture 25 may consist of a strip of sheet metal, which is wide enough in a vertical direction to provide an adequate body strength and for the purpose of securing an adequate bearing area on the end of the cross arm.

This strip of sheet metal has a securing flange at 27 and is bent at right angles at 28 to provide a body flange 29, which engages the end of the cross arm.

At the rear side of the cross arm, that is, the point 30, the sheet metal strip is bent outwardly at an obtuse angle so that the bolt bearing flange 31 extends at substantially right angles to the truss tension member 26.

Bolt bearing flange 31 is provided with an aperture 32 for passing the truss tension member 26. The sheet metal strip forming the fixture 25 is again bent inwardly at 33, at an acute angle, but with a relatively easy bend, thus making the flange 34 extend diagonally forward and inward toward the cross arm.

The flange 34 supports an attaching flange 35, which is parallel to the rear surface of the cross arm and to the flange 27 and which is spaced from the flange 27 so that both of these flanges bear on the sides of the cross arm.

Attaching flanges 27 and 35 are provided with registering apertures 36, 37 for passing the wood bolt 38, which also passes through the aperture 39 in the cross arm. The aperture 39 in the cross arm is so located with respect to the structure of the fixture that when the fixture is secured in the end of the cross arm the body flange 29 bears tightly against the squared end of the cross arm.

In some embodiments of the invention a plurality of apertures 36, 37 and 32 and a plurality of bolts 38 may be used for securing the fixture 25 on the cross arm, but ordinarily two bolts are required.

The bolts 38 hold the fixture 25 firmly on the end of the cross arm, and rotation of the fixture is prevented by the flat engagement of the body flange 29 with the end of the cross arm.

The diagonal flange 34 of the end fixture 25 is also provided with an elongated slot 41 for passing the truss tension member 26, since this flange extends diagonally to the tension member 26.

The apertures 32 and 41 are preferably located midway between the top and bottom of the strip of which the end fixture 25 is constructed so as to cause the tension member 26 to exert a balanced pull on the ends of the cross arm.

The bolt 12, which supports the cross arm on the bolt, also preferably supports a pole fixture or saddle 40, which provides an increased bearing for the truss tension member 26 against the side of the pole and maintains its alignment with the cross arm.

The saddle 40 preferably comprises two parts, a pole bearing plate 42 and a clamping plate 43. The pole bearing plate 42 may comprise a cast metal member of substantially rectangular shape in elevation, the front side of which is provided with a curved partially cylindrical surface 44 adapted to have a substantial fit with the side of a transmission line pole of average size. Saddle plate 42 may have prongs 60a.

In the event the curvature of the pole differs from the surface 44, the plate 42 will, nevertheless, make an impression on the surface of the pole to secure a firm bearing area.

On its rear side 45 the plate 42 may be substantially flat or plane, but it is provided with a transverse groove 46, which is partially circular in cross sectional shape so as to fit the rod or tension member 26. The groove 46 is curved longitudinally in a reverse direction to fit the reverse curvature of the rod 26 as it passes about the plate 46.

The clamping plate 43 may comprise a smaller metal plate, having a flat surface for engaging the nut 47 and having on its other side a transverse groove fitting the lateral and reverse curvature of the rod 26 on that side.

The plates 42, 43 are provided with through apertures for passing the bolt 12. In order that the truss rod 26 may be located midway between the top and bottom of the cross arm 11, the bolt 12 may have its aperture in the cross arm located slightly below the center of the cross arm so that the bolt 12 is located below the truss rod 26 in the saddle 40.

The truss rod or truss tension member 26 comprises a steel rod, which is threaded at both ends and provided with the lock washers and nuts 48, 49 at its ends.

Lug 61 carried by plate 43 engages in slot 62 in plate 42 to prevent relative rotation between the plates.

The rod 26 is bent with a forwardly extending reverse curvature and extends in both directions from midway between its ends at the pole 10 or saddle 40 at an obtuse angle. These two portions of the truss rod on opposite sides of the pole are indicated by the numerals 50 and 51, and they are generally directed at a point inwardly of the ends of the cross arm.

The reverse bend 70 engages in a complementary recess in between plates 42, 43 to lock the rod against longitudinal movement.

At the points 52 and 53, substantially midway between the ends of the cross arm and the center of the pole, the truss rod is bent backwardly at an obtuse angle in such manner that its threaded ends will extend toward and fit in the apertures 32 in the end fixtures, when the parts are assembled as shown in Fig. 1.

The end portions of the truss rod 26 have been indicated by the numerals 54 and 55. The truss rod is preferably adapted to give the cross arm additional support at points intermediate the ends of the cross arm and the center of the pole by means of intermediate fixtures 56, 57.

These fixtures are shown in greater detail in Fig. 3, and each fixture may consist of a U-shaped stirrup 58 of sheet metal, bent to fit around the front, top, and bottom of the cross arm, and having its legs projecting beyond the rear face of the cross arm.

The stirrup 58 has an aperture 59 for receiving the wood bolt 60, which passes through the yoke of the stirrup and through the cross arm and secures the stirrup at a definite point on the cross arm.

The legs of the stirrup 58 support a second rod engaging stirrup 61, which is of substantially V shape, except that its yoke has a rectangular or cylindrical portion 62 for engaging about the truss rod 26.

From the yoke portion 62 the two legs of the stirrup 61 extend diagonally outward and are provided with parallel attaching flanges 63 engaging inside the lugs of the stirrup 58. The screw bolts 64 or rivets may be used for pivotally securing the legs of the stirrup 58 to the attaching flanges 63 of the stirrup 61.

The operation of the back truss is as follows: Before the load is placed on the cross arm 11, the parts of the cross arm and the back truss are assembled as shown in Fig. 1, and an initial tension is placed on the truss rod 26 by tightening the nuts 48, 49.

This tension tends to cause the truss rod to straighten at the points 52, 53, placing a tension on the stirrups 58 and 61 and causing the truss rod to exert a rearward force on the cross arm at the points of location of the fixtures 56, 57.

The truss rod 26 also places a rearward bending force on the entire cross arm 11, and the cross arm may be bent backwardly somewhat before the load is applied.

Various sizes of truss rods and sheet metal parts may be employed, and in one embodiment of the invention the truss rod may be of three-fourths inch rod, with the steel brackets or fixtures made of plates one-fourth inch thick. For lesser strains five-eighths inch rods have been employed. The sizes of the parts may, of course, be made suitable for the strains to be applied to the cross arm and truss.

After the truss rod has been initially tensioned, load may be applied to the cross arm, and then the nuts 48, 49 of the truss rod may be tightened still further, to reduce the deflection of the cross arm and equalize or diminish some of the strains placed upon the cross arm.

The truss rod tends to place a compression on the rear side of the cross arm and to reduce the compression on the front side. At the same time it gives the cross arm additional support at its ends and intermediate its ends against bending stresses, and by means of this structure a much more safe and rigid dead end installation may be made at a minimum amount of expense.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a trussed cross arm, the combination of a pole with a cross arm carried by said pole, a threaded member passing through the pole and cross arm to secure them together, a saddle carried by said threaded member and engaging the pole, said saddle having a curved engaging surface and comprising a pair of parts having opposed grooves for receiving a truss rod, one of said opposed grooves having a projection, and the other having a recess opposite said projection, and said truss rod having a corresponding bent portion to fit in said grooves and secure the truss rod against longitudinal movement, a fitting carried at each end of said cross arm, said fitting comprising a metal member extending about the end of the cross arm, and having a through bolt extending through the portions on the opposite sides of the cross arm to secure it to the cross arm, said fitting having a laterally extending loop on the rear side of the cross arm, and said loop being provided with a pair of apertures for receiving the ends of the truss rod, threaded means on each end of the truss rod for engaging said fittings and placing the tension on the truss rod, and stirrups carried by said cross arm intermediate each end of the cross arm and the pole, said stirrups extending about said truss rod at a point where the truss rod has an inward bend, said truss rod and stirrups being placed under tension by said threaded means at the end of the truss rod for increasing the lateral strength of said cross arm.

2. In a cross arm assembly, the combination of a cross arm with a securing bolt passing through its center portion and having a pair of clamping members mounted thereon, said clamping members having formed therein a groove for receiving a truss rod, and said groove being longitudinally curved to receive a complementarily curved portion of said truss rod whereby the truss rod is secured against longitudinal movement at said bolt, said cross arm having at its ends a fitting with an aperture for receiving the end of said truss rod, said fitting extending about the end of the cross arm and being secured thereto by threaded means passing through the fitting and the cross arm to prevent the splitting of the cross arm at its ends under strain, said truss rod having intermediate the pole bolt and each end of the truss rod an angular bend at an obtuse angle and a stirrup extending about said truss rod at said bend and about said cross arm, the straightening tendency of said truss rod under tension exerting a tension on said stirrup to distribute the load on said cross arm more uniformly, said truss rod having threaded members at its ends for placing a predetermined tension on the truss rod.

3. In a cross arm assembly, the combination of a cross arm and pole having bores for receiving a through bolt, with a securing fixture carried by said bolt located on said pole, said securing fixture having a groove therein for receiving a tension member, and said groove having a depression for receiving a complementary depression in the tension member, a tension member located on the side of the pole opposite to the cross arm and passing through said fixture, said tension member being provided with threaded members at each of its ends, and said threaded members passing through a reinforcing fixture for each end of the cross arm, said reinforcing fixtures comprising U-shaped members passing about the end of the cross arm and engaging each side thereof and having means for securing the reinforcing fixtures to the cross arm, said tension member being of stiff characteristics and being pre-bent to shape, and having intermediate the pole on each end of the cross arm an angular bend located at a predetermined point to be engaged by a stirrup member passing about said cross arm and about said tension member whereby the cross arm is adapted to resist a greatly increased distributed force applied in a horizontal direction to the cross arm in a direction extending oppositely to the direction of the tension member with respect to the cross arm.

DAVID C. HUBBARD.